(12) United States Patent
Huang et al.

(10) Patent No.: US 10,983,393 B2
(45) Date of Patent: Apr. 20, 2021

(54) DISPLAY DEVICE

(71) Applicant: Wuhan China Star Optoelectronics Technology Co., Ltd., Hubei (CN)

(72) Inventors: Jianlong Huang, Hubei (CN); Gaiping Lu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/623,512

(22) PCT Filed: Nov. 11, 2019

(86) PCT No.: PCT/CN2019/117058
§ 371 (c)(1),
(2) Date: Dec. 17, 2019

(65) Prior Publication Data
US 2021/0033919 A1 Feb. 4, 2021

(30) Foreign Application Priority Data
Jul. 29, 2019 (CN) .......................... 201910688021.X

(51) Int. Cl.
*G02F 1/1335* (2006.01)
(52) U.S. Cl.
CPC .. *G02F 1/133528* (2013.01); *G02F 1/133514* (2013.01)
(58) Field of Classification Search
None
See application file for complete search history.

(56) References Cited

U.S. PATENT DOCUMENTS

| | | | | |
|---|---|---|---|---|
| 2011/0261283 A1* | 10/2011 | Kim | .................. | G03B 29/00 349/58 |
| 2012/0105400 A1* | 5/2012 | Mathew | ............... | H04N 5/2257 345/207 |
| 2013/0258234 A1* | 10/2013 | Park | .................. | G02F 1/133512 349/58 |
| 2013/0270418 A1* | 10/2013 | Cho | .................. | G01C 3/08 250/206.1 |
| 2016/0093596 A1* | 3/2016 | Hong | .................... | H01L 27/124 257/72 |
| 2016/0212311 A1* | 7/2016 | Mathew | ................ | G06F 1/1686 |
| 2017/0251137 A1* | 8/2017 | Evans, V | .............. | H04N 5/2354 |

(Continued)

FOREIGN PATENT DOCUMENTS

CN 202394156 U 8/2012
CN 203433238 U 2/2014
(Continued)

*Primary Examiner* — Ryan Crockett
(74) *Attorney, Agent, or Firm* — Hamre, Schumann, Mueller & Larson, P.C.

(57) ABSTRACT

A liquid crystal display panel and a substrate manufacturing method are provided. The liquid crystal display panel includes an array substrate, a color filter substrate, and a liquid crystal layer disposed between the array substrate and the color filter substrate. A first protrusion is disposed on a surface of the array substrate away from the liquid crystal layer, a second protrusion is disposed on a surface of the color filter substrate away from the liquid crystal layer, and the first protrusion is opposite to the second protrusion.

16 Claims, 3 Drawing Sheets

(56) References Cited

U.S. PATENT DOCUMENTS

| | | | |
|---|---|---|---|
| 2018/0067367 A1* | 3/2018 | Yu | G02F 1/136209 |
| 2019/0236329 A1* | 8/2019 | Zhang | G06F 1/1684 |
| 2020/0176496 A1* | 6/2020 | Kimura | H01L 27/14618 |
| 2020/0192142 A1* | 6/2020 | Kim | G02F 1/1333 |

FOREIGN PATENT DOCUMENTS

| | | | |
|---|---|---|---|
| CN | 103864311 A | * | 6/2014 |
| CN | 203838722 U | | 9/2014 |
| CN | 105389051 A | | 3/2016 |
| CN | 105487284 A | | 4/2016 |
| CN | 107229148 A | | 10/2017 |
| CN | 107277196 A | | 10/2017 |
| CN | 108710241 A | | 10/2018 |
| CN | 109307962 A | | 2/2019 |

\* cited by examiner

DISPLAY DEVICE

FIELD OF DISCLOSURE

The present disclosure relates to the field of display technologies, and in particular, to a liquid crystal display panel and a substrate manufacturing method.

BACKGROUND

In liquid crystal display panel industries, a camera hole or a sensing hole of a sensor can be formed on a display area by through hole technologies, thereby greatly increasing a screen-to-body ratio. However, in a through hole region, since layer structures of an array substrate and a color filter substrate are all hollowed out, thicknesses of the through hole region and a liquid crystal layer of the display area are different, thereby generating interference patterns.

SUMMARY OF DISCLOSURE

The present disclosure provides a liquid crystal display panel and a substrate manufacturing method, which can solve the problem of interference patterns, thereby improving display quality.

An embodiment of the present disclosure provides a liquid crystal display panel, including an array substrate, a color filter substrate, and a liquid crystal layer disposed between the array substrate and the color filter substrate.

A first protrusion is disposed on a surface of the array substrate away from the liquid crystal layer, a second protrusion is disposed on a surface of the color filter substrate away from the liquid crystal layer, and the first protrusion is opposite to the second protrusion.

The liquid crystal display panel further includes a first optical functional layer and a second optical functional layer, the first optical functional layer is disposed on the surface of the array substrate away from the liquid crystal layer, and the second optical functional layer is disposed on the surface of the color filter substrate away from the liquid crystal layer.

A first through hole is formed on the first optical functional layer, a second through hole is formed on the second optical functional layer, the first protrusion is disposed in the first through hole, and the second protrusion is disposed in the second through hole.

The array substrate includes a first region and a second region connected to the first region, the color filter substrate includes a third region and a fourth region connected to the third region, the first region is opposite to the third region, and the second region is opposite to the fourth region.

The first protrusion is formed on the second region by performing a uniform thinning process on the first region, and the second protrusion is formed on the fourth region by performing the uniform thinning process on the third region.

In the liquid crystal display panel of the present disclosure, the first protrusion is in contact with a side wall of the first optical functional layer at the first through hole.

In the liquid crystal display panel of the present disclosure, the second protrusion is in contact with a side wall of the second optical functional layer at the second through hole.

In the liquid crystal display panel of the present disclosure, a surface of the first protrusion away from the liquid crystal layer is flush with a surface of the first optical functional layer away from the liquid crystal layer.

In the liquid crystal display panel of the present disclosure, a surface of the second protrusion away from the liquid crystal layer is flush with a surface of the second optical functional layer away from the liquid crystal layer.

In the liquid crystal display panel of the present disclosure, shapes of the first through hole and the second through hole include a circular shape and an elliptical shape.

In the liquid crystal display panel of the present disclosure, a distance between the first region and the third region is equal to a distance between the second region and the fourth region.

An embodiment of the present disclosure also provides a liquid crystal display panel, including an array substrate, a color filter substrate, and a liquid crystal layer disposed between the array substrate and the color filter substrate.

A first protrusion is disposed on a surface of the array substrate away from the liquid crystal layer, a second protrusion is disposed on a surface of the color filter substrate away from the liquid crystal layer, and the first protrusion is opposite to the second protrusion.

In the liquid crystal display panel of the present disclosure, the liquid crystal display panel further includes a first optical functional layer and a second optical functional layer, the first optical functional layer is disposed on the surface of the array substrate away from the liquid crystal layer, and the second optical functional layer is disposed on the surface of the color filter substrate away from the liquid crystal layer.

A first through hole is formed on the first optical functional layer, a second through hole is formed on the second optical functional layer, the first protrusion is disposed in the first through hole, and the second protrusion is disposed in the second through hole.

In the liquid crystal display panel of the present disclosure, the first protrusion is in contact with a side wall of the first optical functional layer at the first through hole.

In the liquid crystal display panel of the present disclosure, the second protrusion is in contact with a side wall of the second optical functional layer at the second through hole.

In the liquid crystal display panel of the present disclosure, a surface of the first protrusion away from the liquid crystal layer is flush with a surface of the first optical functional layer away from the liquid crystal layer.

In the liquid crystal display panel of the present disclosure, a surface of the second protrusion away from the liquid crystal layer is flush with a surface of the second optical functional layer away from the liquid crystal layer.

In the liquid crystal display panel of the present disclosure, shapes of the first through hole and the second through hole include a circular shape and an elliptical shape.

In the liquid crystal display panel of the present disclosure, the array substrate includes a first region and a second region connected to the first region, the color filter substrate includes a third region and a fourth region connected to the third region, the first region is opposite to the third region, and the second region is opposite to the fourth region.

The first protrusion is formed on the second region by performing a uniform thinning process on the first region, and the second protrusion is formed on the fourth region by performing the uniform thinning process on the third region.

In the liquid crystal display panel of the present disclosure, a distance between the first region and the third region is equal to a distance between the second region and the fourth region.

An embodiment of the present disclosure also provides a substrate manufacturing method, including following steps.

A glass substrate is provided. The glass substrate includes an area to be thinned and a non-thinned area.

A protective layer is attached to the glass substrate, and a portion of the protective layer on the area to be thinned is removed.

The area to be thinned of the glass substrate is etched and thinned such that a protrusion is formed on the non-thinned area with respect to the area to be thinned.

Another portion of the protective layer on the non-thinned area is removed, and an optical functional layer is disposed on the glass substrate. The optical functional layer is provided with a through hole, and the protrusion is disposed in the through hole.

In the liquid crystal display panel and substrate manufacturing method of the embodiments of the present disclosure, light transmission areas are formed by the first protrusion and the second protrusion, so that light can be transmitted to functional devices, such as a camera and a sensor, disposed under the liquid crystal display panel. A thickness of the region where the functional devices, such as the camera and the sensor, are located is increased, so a light intensity of the light transmission area is increased, thereby reducing a deformation, solving the problem of the interference pattern, and improving the display quality.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other accompanying drawings can be obtained by those of ordinary skill in the art without any creative effort.

DETAILED DESCRIPTION

Figure 1:
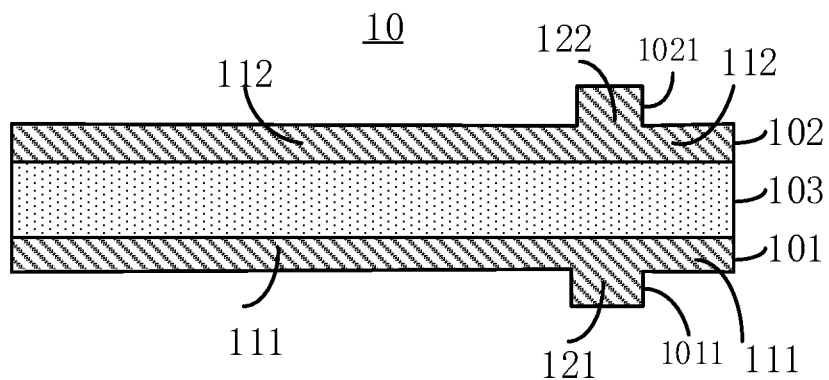
FIG. 1 is a schematic diagram of a liquid crystal display panel according to an embodiment of the present disclosure.

The embodiments of the present disclosure will be described in detail below with reference to the accompanying drawings in which same or similar reference numerals indicate the same or similar elements, or elements with same or similar function. The embodiments described below with reference to the accompanying drawings are exemplary and are merely used to explain the present disclosure, but should not be construed as limiting the present disclosure.

In the description of the present disclosure, it is to be understood that orientations or position relationships illustrated by terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" are based on orientation or position relationship based on the accompanying drawings, and are not used to indicate or imply the devices or elements must have specific orientations, and must be constructed and operated in specific orientations, and shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" or "a number of" means two or more than two, unless specified otherwise.

Referring to FIG. 1, which is a schematic diagram of a liquid crystal display panel according to an embodiment of the present disclosure. The liquid crystal display panel 10 includes an array substrate 101, a color filter substrate 102, and a liquid crystal layer 103 disposed between the array substrate 101 and the color filter substrate 102. A first protrusion 1011 is disposed on a surface of the array substrate 101 away from the liquid crystal layer 103, a second protrusion 1021 is disposed on a surface of the color filter substrate 102 away from the liquid crystal layer 103, and the first protrusion 1011 is opposite to the second protrusion 1021.

It should be noted that in the embodiment of the liquid crystal display panel 10 of the present disclosure, light transmission areas are formed by the first protrusion 1011 and the second protrusion 1021, so that light can be transmitted to functional devices, such as a camera and a sensor, disposed under the liquid crystal display panel 10. A thickness of the region where the functional devices, such as the camera and the sensor, are located is increased, so a light intensity of the light transmission area is increased, thereby reducing a deformation, solving a problem of an interference pattern, and improving a display quality.

In one embodiment, the array substrate 101 includes a first region 111 and a second region 121 connected to the first region 111, the color filter substrate 102 includes a third region 112 and a fourth region 122 connected to the third region 112, the first region 111 is opposite to the third region 112, and the second region 121 is opposite to the fourth region 122. The first protrusion 1011 is formed on the second region 121 by performing a uniform thinning process on the first region 111, and the second protrusion 1021 is formed on the fourth region 122 by performing the uniform thinning process on the third region 112.

For example, in a specific manufacturing, a protective layer is covered on the second region 121, and then the first region 111 is etched so that a thickness of the first region 111 is less than a thickness of the second region 121, thereby protruding the second region 121 to form the first protrusion 1011. Moreover, a protective layer is covered on the fourth region 122, and then the third region 112 is etched such that a thickness of the third region 112 is less than a thickness of the fourth region 122, thereby protruding the fourth region 122 to form the second protrusion 1021.

Furthermore, a distance between the first region 111 and the third region 112 is equal to a distance between the second region 121 and the fourth region 122. That is, in the present disclosure, by disposing the first protrusion 1011 and the second protrusion 1021, a deformation amount of the first protrusion 1011 and the second protrusion 1021 is reduced, thereby improving the display quality from the problem of solving the interference pattern.

Figure 2:
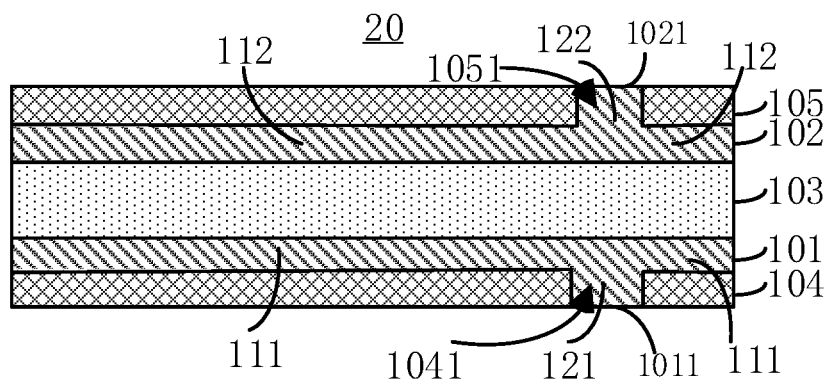
FIG. 2 is a schematic diagram of a liquid crystal display panel according to another embodiment of the present disclosure.

Referring to FIG. 2, which is a schematic diagram of a liquid crystal display panel according to another embodiment of the present disclosure. A difference between a liquid crystal display panel 20 shown in FIG. 2 and the liquid crystal display panel 10 shown in FIG. 1 is that the liquid crystal display panel 20 shown in FIG. 2 further includes a first optical functional layer 104 and a second optical functional layer 105. The first optical functional layer 104 is disposed on the surface of the array substrate 101 away from the liquid crystal layer 103, and the second optical functional layer 105 is disposed on the surface of the color filter substrate 102 away from the liquid crystal layer 103. A first through hole 1041 is formed on the first optical functional layer 104, and a second through hole 1051 is formed on the second optical functional layer 105. The first protrusion 1011 is disposed in the first through hole 1041, and the second protrusion 1021 is disposed in the second through hole 1051.

In some embodiments, shapes of the first through hole 1041 and the second through hole 1051 include a circular shape and an elliptical shape.

In some embodiments, the first optical functional layer 104 and the second optical functional layer 105 may be polarizers.

Specifically, in one embodiment, the first protrusion 1011 is in contact with a side wall of the first optical functional layer 104 at the first through hole 1041. The second protrusion 1021 is in contact with a side wall of the second optical functional layer 105 at the second through hole 1051. A surface of the first protrusion 1011 away from the liquid crystal layer 103 is flush with a surface of the first optical functional layer 104 away from the liquid crystal layer 103. A surface of the second protrusion 1021 away from the liquid crystal layer 103 is flush with a surface of the second optical functional layer 105 away from the liquid crystal layer 103. That is, the first protrusion 1011 is adapted to the first through hole 1041, and the second protrusion 1021 is adapted to the second through hole 1051, so that an overall structure of the liquid crystal display panel 20 can be made more compact.

In another embodiment, the first protrusion 1011 may be out of contact with the side wall of the first optical functional layer 104 at the first through hole 1041. The second protrusion 1021 may be out of contact with the side wall of the second optical functional layer 105 at the second through hole 1051. That is, there is a gap between the first protrusion 1011 and the side wall of the first optical function layer 104 at the first through hole 1041, and there is a gap between the second protrusion 1021 and the side wall of the second optical functional layer 105 at the second through hole 1051. The surface of the first protrusion 1011 away from the liquid crystal layer 103 and the surface of the first optical functional layer 104 away from the liquid crystal layer 103 may not be flush, but the surface of the first protrusion 1011 away from the liquid crystal layer 103 is still disposed in the first through hole 1041. The surface of the second protrusion 1021 away from the liquid crystal layer 103 and the surface of the second optical functional layer 105 away from the liquid crystal layer 103 may not be flush, but the surface of the second protrusion 1021 away from the liquid crystal layer 103 is still disposed in the second through hole 1051.

Figure 3:
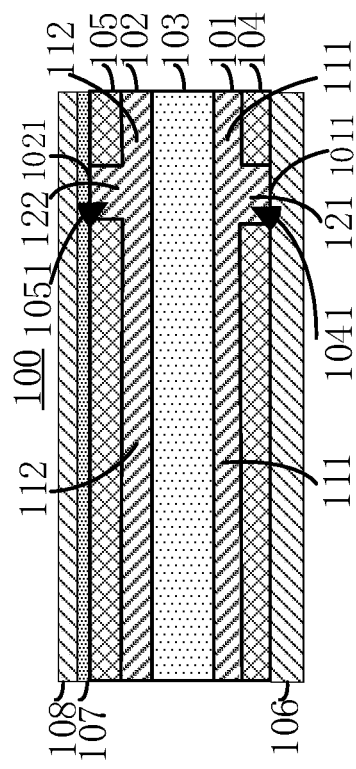
FIG. 3 is a schematic diagram of a liquid crystal display device according to an embodiment of the present disclosure.

Please refer to FIG. 3, which is a schematic diagram of a liquid crystal display device according to an embodiment of the present disclosure. As shown in FIG. 3, the liquid crystal display device 100 of the embodiment of the present disclosure includes a liquid crystal display panel, a backlight module 106, and a glass cover 108. The liquid crystal display panel is the liquid crystal display panel of the above embodiments. The backlight module 106 is disposed below the liquid crystal display panel, and the glass cover 108 is disposed above the liquid crystal display panel through an optical adhesive layer 107.

In the embodiment of the liquid crystal display device of the present disclosure, light transmission areas are formed by the first protrusion and the second protrusion, so that light can be transmitted to functional devices, such as a camera and a sensor, disposed under the liquid crystal display panel. A thickness of the region where the functional devices, such as the camera and the sensor, are located is increased, so a light intensity of the light transmission area is increased, thereby reducing a deformation, solving a problem of an interference pattern, and improving a display quality.

Figure 4:
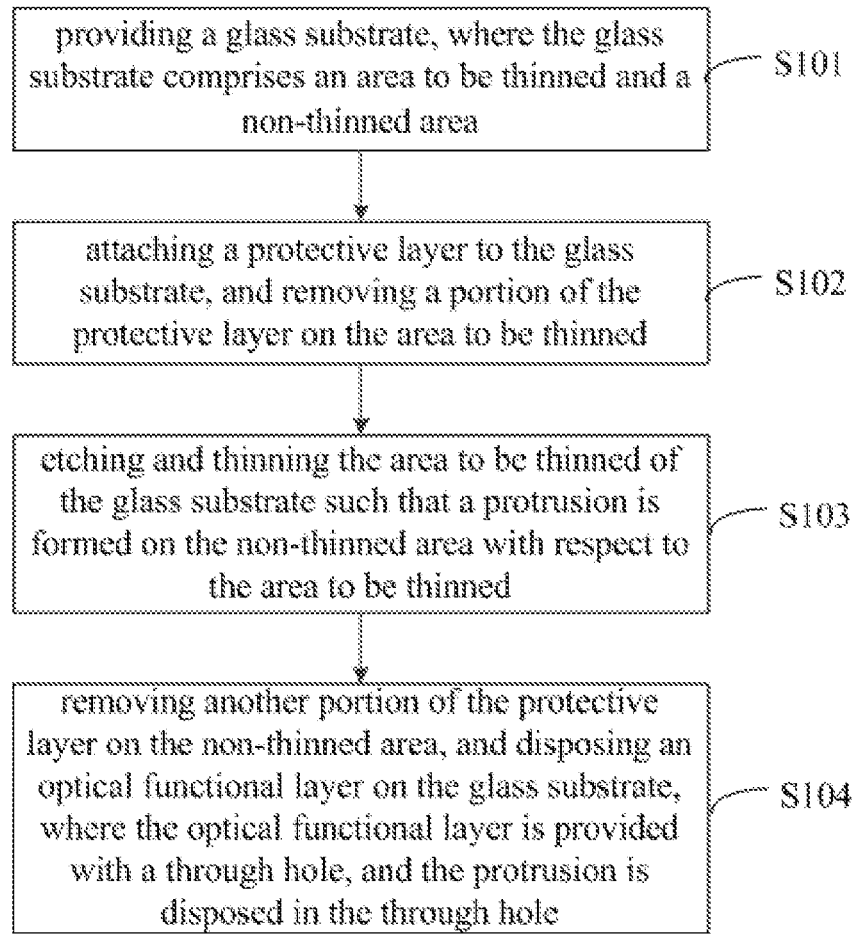
FIG. 4 is a flowchart of a substrate manufacturing method according to an embodiment of the present disclosure.

Please refer to FIG. 4, which is a flowchart of a substrate manufacturing method according to an embodiment of the present disclosure. As shown in FIG. 4, the substrate manufacturing method includes the following steps.

In a step S101, a glass substrate is provided. The glass substrate includes an area to be thinned and a non-thinned area.

The substrate produced by the method is an array substrate or a color filter substrate. Therefore, the glass substrate can be a glass substrate of the array substrate or a glass substrate of the color filter substrate.

In a step S102, a protective layer is attached to the glass substrate, and a portion of the protective layer on the area to be thinned is removed.

In this step, the protective layer is patterned to remove the portion of the protective layer on the area to be thinned.

In a step S103, the area to be thinned of the glass substrate is etched and thinned such that a protrusion is formed on the non-thinned area with respect to the area to be thinned.

In this step, a thickness removed by the etching and thinning process may be determined according to the thickness of the optical functional layer disposed on the surface of the array substrate or the color filter substrate.

In a step S105, another portion of the protective layer on the non-thinned area is removed, and an optical functional layer is disposed on the glass substrate. The optical functional layer is provided with a through hole, and the protrusion is disposed in the through hole.

The optical functional layer is a polarizer. An outer surface of the optical functional layer is flush with an outer surface of a thickened portion of the glass.

It can be understood that in some embodiments, the glass substrate can include a plurality of unit regions, each of which corresponds to one substrate. After a layer is attached to the plurality of unit regions, the unit regions are etched and thinned. Then, the unit regions are cut to obtain a plurality of array substrates or color filter substrates.

Although the forgoing has shown and described the embodiments of the present disclosure, the above embodiments cannot be construed to limit the present disclosure. Those skilled in the art can make changes and modifications within the scope of the present disclosure without departing from the principles and purposes of the present disclosure. The scope of the present disclosure is limited by the appending claims.

What is claimed is:

1. A display device, comprising a liquid crystal display panel and a functional device disposed under the liquid crystal display panel, wherein the liquid crystal display panel comprises an array substrate, a color filter substrate, and a liquid crystal layer disposed between the array substrate and the color filter substrate;

wherein a first protrusion is disposed on a surface of the array substrate away from the liquid crystal layer, a second protrusion is disposed on a surface of the color filter substrate away from the liquid crystal layer, and the first protrusion is opposite to the second protrusion;

wherein the functional device is disposed corresponding to the first protrusion and the second protrusion and configured to receive light transmitted through the first protrusion and the second protrusion;

wherein the liquid crystal display panel further comprises a first optical functional layer and a second optical functional layer, the first optical functional layer is disposed on the surface of the array substrate away from the liquid crystal layer, and the second optical functional layer is disposed on the surface of the color filter substrate away from the liquid crystal layer;

wherein a first through hole is formed on the first optical functional layer, a second through hole is formed on the second optical functional layer, the first protrusion is disposed in the first through hole, and the second protrusion is disposed in the second through hole;

wherein the array substrate comprises a first region and a second region connected to the first region, the color filter substrate comprises a third region and a fourth region connected to the third region, the first region is opposite to the third region, and the second region is opposite to the fourth region; and wherein the first protrusion is formed on the second region by performing a uniform thinning process on the first region, and the second protrusion is formed on the fourth region by performing the uniform thinning process on the third region.

2. The display device as claimed in claim 1, wherein the first protrusion is in contact with a side wall of the first optical functional layer at the first through hole.

3. The display device as claimed in claim 1, wherein the second protrusion is in contact with a side wall of the second optical functional layer at the second through hole.

4. The display device as claimed in claim 1, wherein a surface of the first protrusion away from the liquid crystal layer is flush with a surface of the first optical functional layer away from the liquid crystal layer.

5. The display device as claimed in claim 1, wherein a surface of the second protrusion away from the liquid crystal layer is flush with a surface of the second optical functional layer away from the liquid crystal layer.

6. The display device as claimed in claim 1, wherein shapes of the first through hole and the second through hole comprise a circular shape and an elliptical shape.

7. The display device as claimed in claim 1, wherein a distance between the first region and the third region is equal to a distance between the second region and the fourth region.

8. A display device, comprising a liquid crystal display panel and a functional device disposed under the liquid crystal display panel, wherein the liquid crystal display panel comprises an array substrate, a color filter substrate, and a liquid crystal layer disposed between the array substrate and the color filter substrate;

wherein a first protrusion is disposed on a surface of the array substrate away from the liquid crystal layer, a second protrusion is disposed on a surface of the color filter substrate away from the liquid crystal layer, and the first protrusion is opposite to the second protrusion; and wherein the functional device is disposed corresponding to the first protrusion and the second protrusion and configured to receive light transmitted through the first protrusion and the second protrusion.

9. The display device as claimed in claim 8, wherein the liquid crystal display panel further comprises a first optical functional layer and a second optical functional layer, the first optical functional layer is disposed on the surface of the array substrate away from the liquid crystal layer, and the second optical functional layer is disposed on the surface of the color filter substrate away from the liquid crystal layer; and wherein a first through hole is formed on the first optical functional layer, a second through hole is formed on the second optical functional layer, the first protrusion is disposed in the first through hole, and the second protrusion is disposed in the second through hole.

10. The display device as claimed in claim 9, wherein the first protrusion is in contact with a side wall of the first optical functional layer at the first through hole.

11. The display device as claimed in claim 9, wherein the second protrusion is in contact with a side wall of the second optical functional layer at the second through hole.

12. The display device as claimed in claim 9, wherein a surface of the first protrusion away from the liquid crystal layer is flush with a surface of the first optical functional layer away from the liquid crystal layer.

13. The display device as claimed in claim 9, wherein a surface of the second protrusion away from the liquid crystal layer is flush with a surface of the second optical functional layer away from the liquid crystal layer.

14. The display device as claimed in claim 9, wherein shapes of the first through hole and the second through hole comprise a circular shape and an elliptical shape.

15. The display device as claimed in claim 8, wherein the array substrate comprises a first region and a second region connected to the first region, the color filter substrate comprises a third region and a fourth region connected to the third region, the first region is opposite to the third region, and the second region is opposite to the fourth region; and wherein the first protrusion is formed on the second region by performing a uniform thinning process on the first region, and the second protrusion is formed on the fourth region by performing the uniform thinning process on the third region.

16. The display device as claimed in claim 15, wherein a distance between the first region and the third region is equal to a distance between the second region and the fourth region.

* * * * *